United States Patent
Bostick et al.

(10) Patent No.: US 8,265,249 B2
(45) Date of Patent: Sep. 11, 2012

(54) CHANGING A STATE OF A REMOTE SWITCH BOX WHICH CONNECTS A PHONE TO A NETWORK

(75) Inventors: James Edward Bostick, Cedar Park, TX (US); Brian Wayne Hansen, Round Rock, TX (US); John Paul Kaemmerer, Pflugerville, TX (US); Raghuraman Kalyanaraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1404 days.

(21) Appl. No.: 11/781,979

(22) Filed: Jul. 24, 2007

(65) Prior Publication Data

US 2009/0028311 A1    Jan. 29, 2009

(51) Int. Cl.
*H04M 1/00* (2006.01)
*H04M 13/00* (2006.01)
(52) U.S. Cl. .................... 379/161; 379/184; 379/194
(58) Field of Classification Search ............. 379/114.14, 379/127.02, 161, 165, 184, 188, 194, 373.02
See application file for complete search history.

(56) References Cited

U.S. PATENT DOCUMENTS

| | | | | |
|---|---|---|---|---|
| 5,425,089 A * | 6/1995 | Chan et al. | | 379/183 |
| 5,530,737 A | 6/1996 | Bartholomew et al. | | |
| 5,832,057 A * | 11/1998 | Furman | | 379/7 |
| 5,978,469 A * | 11/1999 | Benson | | 379/377 |
| 6,061,438 A * | 5/2000 | Shen et al. | | 379/161 |
| 6,345,187 B1 | 2/2002 | Berthoud et al. | | |
| 6,704,414 B2 | 3/2004 | Murakoshi | | |
| 6,952,471 B1 | 10/2005 | Cannon et al. | | |
| 6,980,634 B1 * | 12/2005 | Davis | | 379/156 |
| 7,023,975 B2 * | 4/2006 | Mansfield et al. | | 379/167.01 |
| 2003/0123644 A1 | 7/2003 | Harrow et al. | | |

* cited by examiner

*Primary Examiner* — Quoc D Tran
(74) *Attorney, Agent, or Firm* — Yee & Associates, P.C.; Mark C. Vallone

(57) ABSTRACT

A computer implemented method, and apparatus for changing a state of a remote switch box. On a master switch box, a request is received from a user to set a state of the remote switch box to a selected state. A request to change the remote switch box to the selected state is transmitted from the master switch box to the remote switch box. The remote switch box connects a remote phone to a phone line. The master switch box receives a confirmation from the remote switch box of the change to the selected state. The confirmation contains the state of the remote switch box. The state of the remote switch box is displayed on the master switch box.

18 Claims, 4 Drawing Sheets

CHANGING A STATE OF A REMOTE SWITCH BOX WHICH CONNECTS A PHONE TO A NETWORK

BACKGROUND OF THE INVENTION

1. Field of the Invention

The present invention relates generally to networks and in particular to communications networks. Still more particularly, the present invention relates to a computer implemented method, and apparatus for changing a state of a remote switch box which connects a phone to a network.

2. Description of the Related Art

In a house, when two or more phones are connected to the phone line, each phone has at least two states. Normally, the phone has an inactive state. The phone transitions from the inactive state to the active state when the user of the phone performs a specific action to the phone, such as, for example, lifting a handset on the phone. Once the phone has an active status, the user may initiate a call by entering a phone number.

The active state allows the user to initiate a phone call, or participate in a phone call initiated by another phone in the house. In the active state, the components of the phone used to initiate a call are connected to the phone line. The active state allows the user to initiate a phone call, or participate in a phone call initiated by another phone in the house.

If several phones are attached to a single phone line, when a first user initiates a call using a first phone, a second user, unaware of the call, may attempt to initiate a call on a second phone. In this example, the second user changes the status of the second phone from an inactive state to an active state, and enters a phone number. Each number the second user enters generates a dual-tone multi-frequency (DTMF) sound. Dual-tone multi-frequency (DTMF) sounds are used in the telephone network for routing the call. The second user is unable to initiate a call, because the first user initiated a call prior to the second user. In this example, the first user hears the second phone change from an inactive state to an active state, and hears the phone number the second user enters as a series of dual-tone multi-frequency (DTMF) sounds. Thus, the second user's attempt to initiate a call disrupts the first user's call.

SUMMARY OF THE INVENTION

The illustrative embodiments described herein provide a computer implemented method, and apparatus for changing a state of a remote switch box. On a master switch box, a request is received from a user to set a state of the remote switch box to a selected state. A request to change the remote switch box to the selected state is transmitted from the master switch box to the remote switch box. The remote switch box connects a remote phone to a phone line. The master switch box receives a confirmation from the remote switch box of the change to the selected state. The confirmation contains the state of the remote switch box. The state of the remote switch box is displayed on the master switch box.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
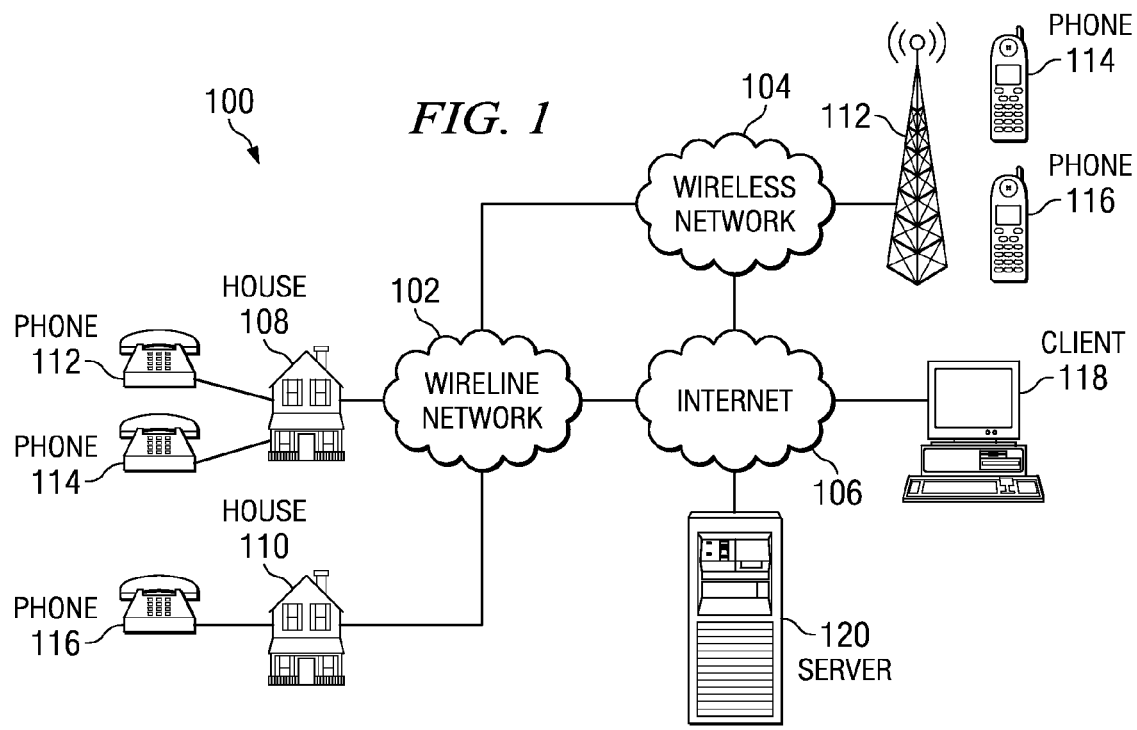
FIG. 1 depicts a pictorial representation of a network of communications systems in which illustrative embodiments may be implemented.
Figure 2:
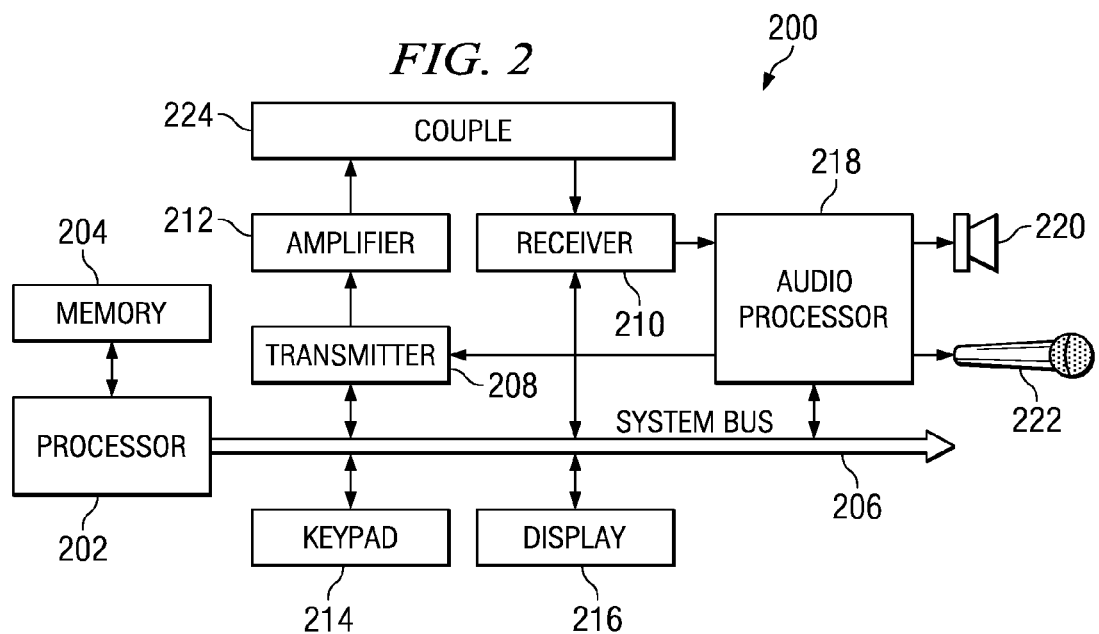
FIG. 2 is a block diagram of a communication device in which illustrative embodiments may be implemented.

With reference now to the figures and in particular with reference to FIGS. 1-2, exemplary diagrams of communication environments are provided in which illustrative embodiments may be implemented. It should be appreciated that FIGS. 1-2 are exemplary and are not intended to assert or imply any limitation with regard to the environments in which different embodiments may be implemented. Many modifications to the depicted environments may be made.

FIG. 1 depicts a pictorial representation of a network of communications systems in which illustrative embodiments may be implemented. In network of communications systems 100, wireline network 102, wireless network 104, and internet 106 are each inter-connected.

Wireline network 102 is a public switched telephone network (PSTN) which uses telephone cable to connect components of the network. For example, a telephone cable is used to connect houses 108-110 to wireline network 102. Phones 112-114 are connected to wireline network 102 via house 108. Similarly, phone 116 is connected to wireline network 102 via house 110.

Wireless network 104 uses a wireless standard to connect the components of the network. Examples of a wireless standard include code-division multiple access (CDMA), and global system for mobile (GSM) wireless standard. In this example, phones 114-116 are wireless handsets used with wireless network 104. For example, phones 114-116 may be, without limitation, cellular telephones, cordless phones, blue tooth, or any other type of wireless phone. Phones 114-116 are wirelessly connected to wireless network 104 via base-stations, such as base-station 112. Each base-station transmits wireless signals to phones 114-116, and receives wireless signals from phones 114-116.

Internet 106 is a packet switched network using a data protocol such as, for example, transmission control protocol/internet protocol (TCP/IP). Internet 106 may contain additional networks, including local area networks (LANs), and wide-area networks (WANs). Client 118 and server connect to internet 106. Client 118, and server 120 are computers running an operating system, such as, for example Windows from Microsoft Corporation, or advanced interactive executive (AIX®) from International Business Machines (IBM®).

With reference now to FIG. 2, a block diagram of a communication device is shown in which illustrative embodiments may be implemented. Communication device 200 includes a processor 202 for controlling operation of the communication device and a memory 204. The processor 202 may be a general-purpose microprocessor operating under the control of instructions stored a memory, such as memory 204, or device-specific circuitry for controlling the operation of the telephone device. Processor 202 is connected by system bus 206 to transmitter 208, receiver 210, keypad 214, display 216, and audio processor 218. Keypad 214 may be a keypad and/or buttons. Display 216 may be any type of display device including a liquid crystal display (LCD) or other known displays, such as a cathode ray tube or active matrix display.

Transmitter 208 and receiver 210 are coupled to a telephone signal by couple 224 to provide full duplex communication. The telephone signal may be provided by a telephone line (not shown) in a land-based telephone or an antenna, such as for a wireless telephone. Audio processing circuit 218 provides basic analog audio outputs to speaker 220 and accepts analog audio inputs from microphone 222. Received signals are demodulated and decoded by receiver 210. Transmitter 208 encodes and modulates signals passed to it by processor 202 or audio processor 218. The output of the transmitter is amplified by power amplifier 212 to control the power level at which the signal is transmitted.

Processor 202 or audio processor 218 may detect audible call status information and call status codes received by receiver 210. Memory 204 may include a lookup table associating call status information or call status codes with visual call status information, such as text messages. Processor 202 detects or receives a call status code and displays an appropriate call status message on display 216. Those of ordinary skill in the art will appreciate that the hardware depicted in FIG. 2 may vary.

Figure 3:
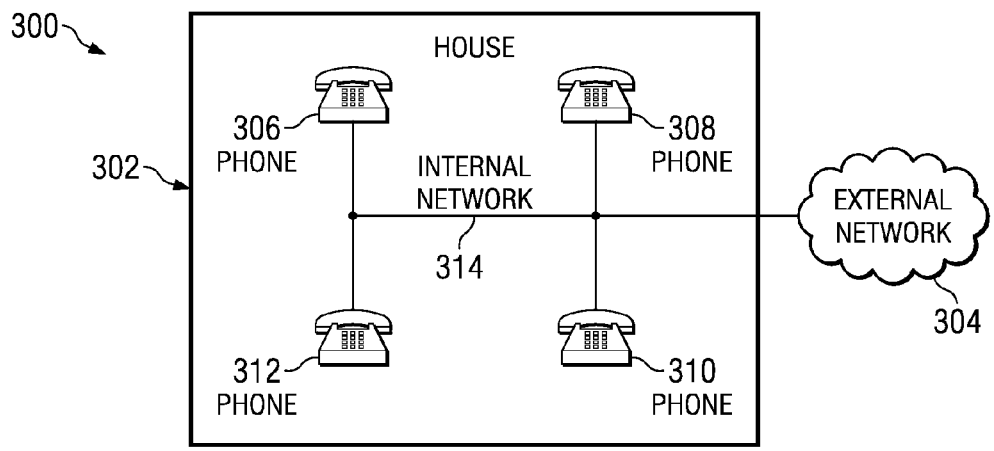
FIG. 3 is a block diagram of a home phone network in accordance with an illustrative embodiment.

FIG. 3 is a block diagram of a home phone network in accordance with an illustrative embodiment. Home phone network 300 depicts a conventional home phone network. External network 304 is a network, such as, for example, a wireline network, such as wireline network 102 in FIG. 1, or a packet-based network, such as internet 106. House 302 is a house, such as house 108 in FIG. 1. In house 302, two or more phones are connected to each other using internal network 314. In this example, four phones, phones 306, 308, 310, and 312, are shown connected to each other using internal network 314.

Internal network 314 is a network within house 302. Internal network 314 is also used to connect phones 306-312 to external network 304. Internal network 314 may contain one or more local-area network communication technologies, including twisted-pair cable, ethernet, and 802.11. External network 304 connects to internal network 314 using one or more communication technologies, including digital subscriber loop (DSL), hybrid-fiber coax (HFC), and dial-up.

When two or more phones, such as phones 306-312, are connected to the phone line, each phone has at least two states. Each phone initially has an inactive state. In the inactive state, the phone is not connected to internal network 314. A keypad, such as keypad 214 in FIG. 2, is used to initiate a call.

When a user of a phone performs a specific action, the phone transitions from the inactive state to an active state. The active state allows the user to initiate a phone call, or participate in a phone call initiated by another phone in the house. In the active state, the keypad of the phone may be used to initiate a call. The active state allows the user to initiate a phone call, or participate in a phone call initiated by another phone in the house. The phone transitions from the inactive state to the active state when the user of the phone performs a specific action to the phone. The specific action required to change the state of the phone from inactive to active may vary from phone to phone. For example, one phone may require the user to lift a handset on the phone to change the state of the phone from inactive to active. Another phone may require the user to press a specific key on the phone to change the state of the phone from inactive to active. Once the phone has an active status, the user may initiate a call by entering a phone number using a keypad, such as keypad 214.

When there are at least two occupants in a house, and at least two phones connected to the phone line, the following situation may occur. Assume a first user initiates a call using a first phone, such as phone 306. A second user, unaware of the call of the first user, attempts to initiate a call on a second phone, such as phone 310.

In this example, the second user changes the status of the second phone from an inactive state to an active state, and enters a phone number using a keypad, keypad 214. When entering the phone number, each number the second user enters generates a dual-tone multi-frequency (DTMF) sound. Dual-tone multi-frequency (DTMF) sounds are used in the telephone network for routing the call. The second user is unable to initiate a call, because the first user initiated a call prior to the second user. In this situation, the first user hears the second phone change from an inactive state to an active state, and hears the phone number the second user enters as a series of dual-tone multi-frequency (DTMF) sounds.

Thus, the second user's attempt to initiate a call disrupts the first user's call. In addition, the privacy of the first user's call is disrupted, because when the second phone changes to an active state, the second user can listen to the first user's call. Therefore, the illustrative embodiments recognize a need for connecting a remote switch box to the second phone and changing the state of the remote switch box to a state specified by the user of the first phone.

The illustrative embodiments described herein provide a computer implemented method, and apparatus for changing a state of a remote switch box. On a master switch box, a request is received from a user to set a state of the remote switch box to a selected state. A request to change the remote switch box to the selected state is transmitted from the master switch box to the remote switch box. The remote switch box connects a remote phone to a phone line. The master switch box receives a confirmation from the remote switch box of the change to the selected state. The confirmation contains the state of the remote switch box. The state of the remote switch box is displayed on the master switch box.

Figure 4:
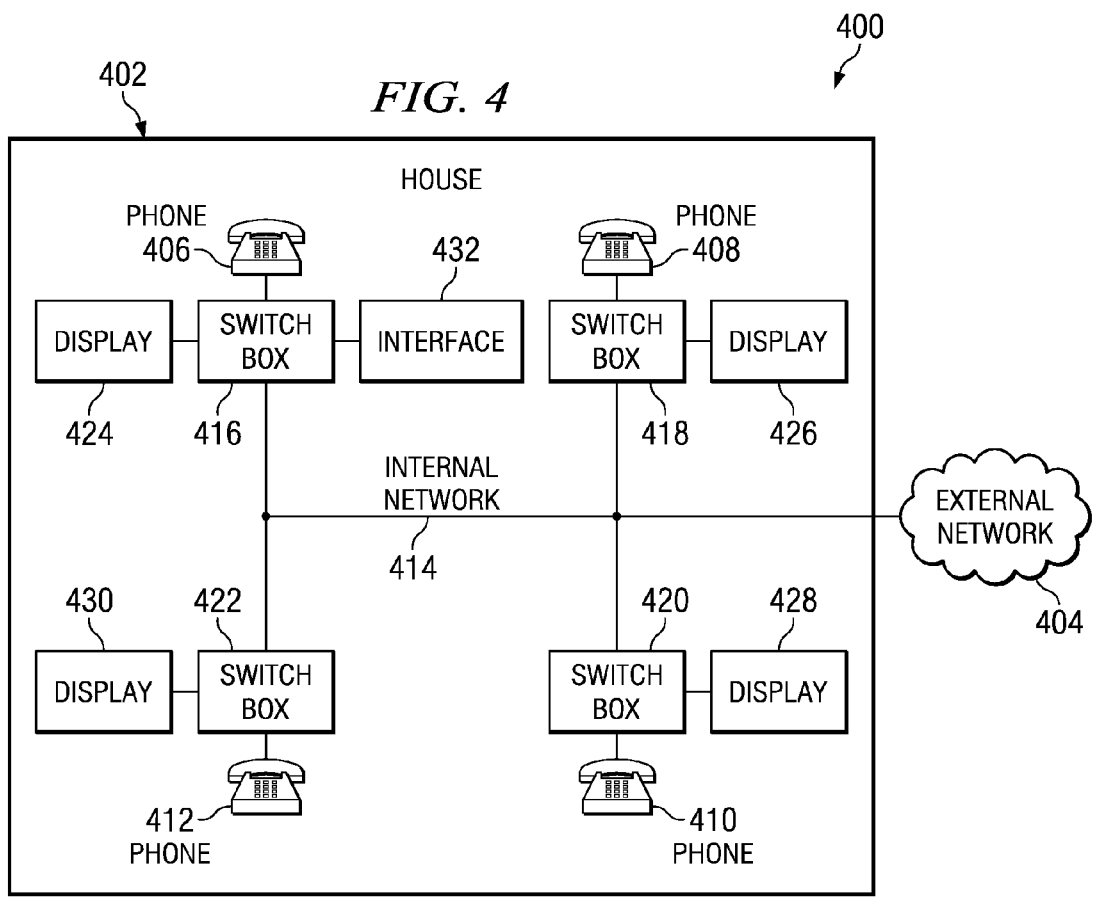
FIG. 4 is a block diagram of a set of switch boxes in a house environment in accordance with an illustrative embodiment.

FIG. 4 is a block diagram of a set of switch boxes in a house environment in accordance with an illustrative embodiment. In a set of switch boxes in a house environment 400, house 402 is a house, such as house 302 in FIG. 3. House 402 is connected to external network 404. External network 404 is a network, such as external network 304. House 402 contains two or more phones. In this example, house 402 contains phones 406, 408, 410, and 412.

A switch box is used to connect each phone in phones 406-410 to internal network 414 in house 402. In this example, switch box 416 connects phone 406 to internal network 414, 418, 420, and 422 are used to connect phones 406, 408, 410, 412, respectively, to internal network 414. Internal network 414 is a network within house 402, such as internal network 302. Internal network 414 is used to connect phones 406-412 to external network 404.

A display is connected to each switch box. The display is used to show a state of the switch box. Each switchbox has at least two states, connected and unconnected. The states are discussed in more detail below. In this example, displays 424, 426, 428, and 430 are connected to switch boxes 416, 418, 420, and 422, respectively.

An interface is connected to at least one switch box in house 402. The interface allows a user to control the state of each of the switch boxes in the house. The switch box connected to the interface is also known as a master switch box. In this example, interface 432 is connected to switch box 416. Interface 432 allows switch box 416 to control the state of switch boxes 416-422.

More than one interface may be used with a set of switch boxes, such as switch boxes 416-422. For example, an interface (not shown) may be connected to switch box 422, to allow both switch box 416, and switch box 422 to control the state of switch boxes 416-422. Alternately, an interface (not shown) may be connected to each of switch boxes 416-422, allowing each switch box to control the state of switch boxes 416-422.

If more than one interface is connected to a switch box in a house, each interface may be locked and unlocked. For example, a keypad may be used to enter a code to lock and unlock the interface box. The keypad may be a keypad of a phone, such as keypad 214 in FIG. 2, or the keypad may be part of interface 414. Alternately, an electronic key may be used. For example, a user may place the electronic key in close proximity to the interface box, and then use the electronic key to transmit a signal to lock and unlock the interface box.

As previously mentioned each switchbox has at least two states, connected and disconnected. When a switch box has the connected state, the switch box connects a phone to an internal network in a house. For example, when switch box 418 has the connected state, switch box 418 connects phone 408 to internal network 414. When a switch box has a disconnected state, the switch box disconnects a phone from the internal network in the house. Thus, when a switch box has the disconnected state, the phone connected to the switch box may not be used to initiate a call. For example, when switch box 418 has a disconnected state, switch box 418 disconnects phone 408 from internal network 414.

Thus, when phone 406 is used to make a call, interface 432 may be used to set each of switch boxes 418-422 to a disconnected state, to prevent a user of one of phones 408-412 from disrupting a phone call of a user of phone 406. In this example, when a user of one of phones 408-412 changes the phone from inactive to active, the phone is not connected to internal network 414 because the switch box connected to the phone has a disconnected state. Therefore, in this example, a user of phone 406 does not hear anything when a user of one of phones 408-412 changes the state of the phone from inactive to active, and uses a keypad on the phone to enter a number.

The state of a switch box is shown on a display connected to the switch box to allow a user to determine the state of the switch box.

For example, when switch box 418 has a disconnected state, a user of phone 408 may determine the state of switch box 418 by viewing display 426. When interface 432 is used to change switch boxes 408-412 to the disconnected state, a user may use displays 426-430 to determine whether switch boxes 408-412 have a disconnected state. For example, if interface 432 is used to change the state of each of switch boxes 418-422 to a disconnected state, displays 426-430 identify that switch boxes 418-422 have a disconnected state.

Typically, a user determines whether a switch box has a disconnected state before changing the state of a phone connected to the switch box from inactive to active.

A switch box may have one or more states in addition to the connected and disconnected states. For example, the switch box may have a long-distance enabled state and a long-distance disabled state. The long-distance enabled state allows a user of the phone connected to the switch box to make a long-distance phone call. The long-distance disabled state does not allow a user of the phone connected to the switch box to make a long-distance phone call. For example, if switch box 418 has a long-distance enabled state, phone 408 may be used to make a long-distance phone call. If switch box 418 has a long-distance disabled state, phone 408 may not be used to make a long-distance phone call.

A switch box may have a ringer-on state and a ringer-off state. The ringer-on state sets a ringer in the phone connected to the switch box to ring when a call is incoming from external network 404 to internal network 414. The ringer-off state sets a ringer in the phone connected to the switch box to not ring when a call is incoming from external network 404 to internal network 414.

Figure 5:
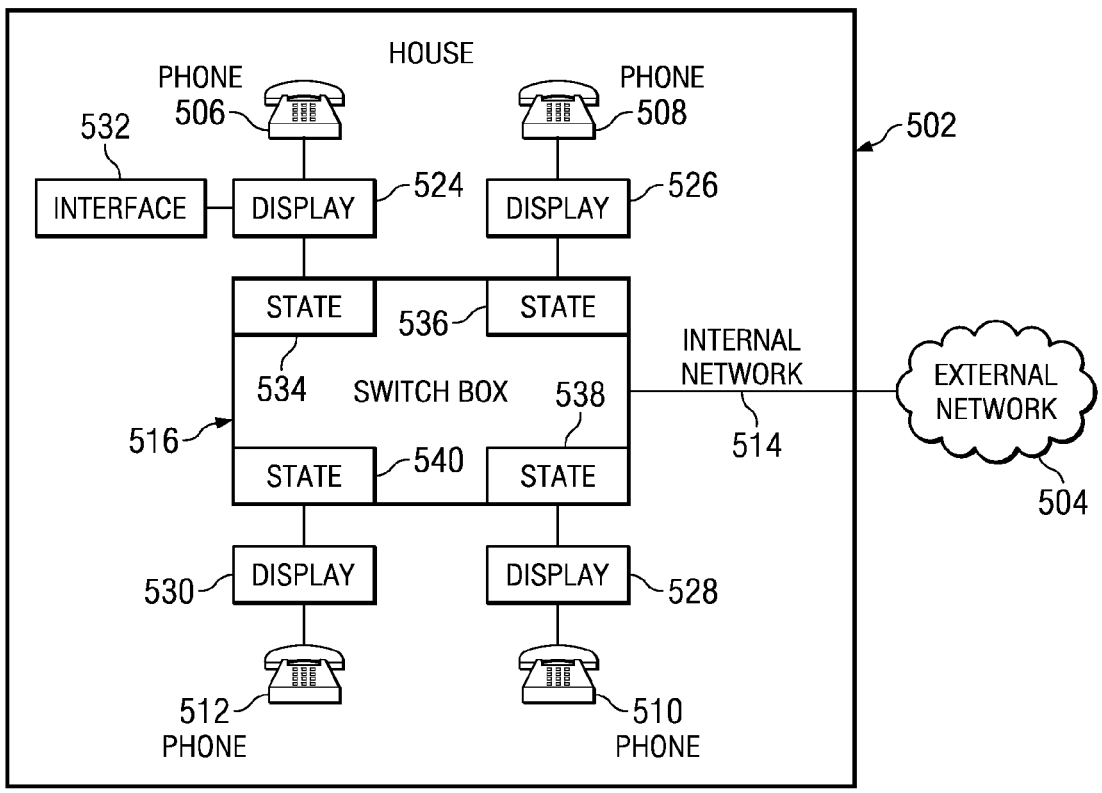
FIG. 5 is a block diagram of a single switch box in a house environment in accordance with an illustrative embodiment.

FIG. 5 is a block diagram of a single switch box in a house environment in accordance with an illustrative embodiment. In a single switch box in a house environment 500, house 502 is a house, such as house 402 in FIG. 4. External network 504 is connected to house 502. External network 504 may be wireline network 102 in FIG. 1, or internet 106.

Phones 506-510 are each connected to internal network 514 through switch box 516. Each phone in phones 506-510 is a communications device such as the communications device depicted in FIG. 2. Displays 524-530 are connected to phones 506-512, and to switch box 516. Displays 524-530 display the state of switch box 516. Switch box 516 contains a state for each phone connected to switch box 516. A user uses interface 532 to change states 534, 536, 538, and 540 in switch box 516.

For example, when a user makes a call using phone 506, the user may use interface 532 to change each state in states 536-540 from connected to disconnected. When each state in states 536-540 is disconnected, a user of one of phones 508-512 may not use phones 508-512 to initiate a call. When each state in states 536-540 is connected, a user of one of phones 508-512 may use phones 508-512 to initiate a call.

In addition to the connected state, and a disconnected state, each state in states 534-536 may have additional states, such as, for example, a long-distance enabled state, a long-distance disabled state, a ringer-on state, and a ringer-off state. Those versed in the art will appreciate that states 534-538 may have additional states besides those described herein.

Figure 6:
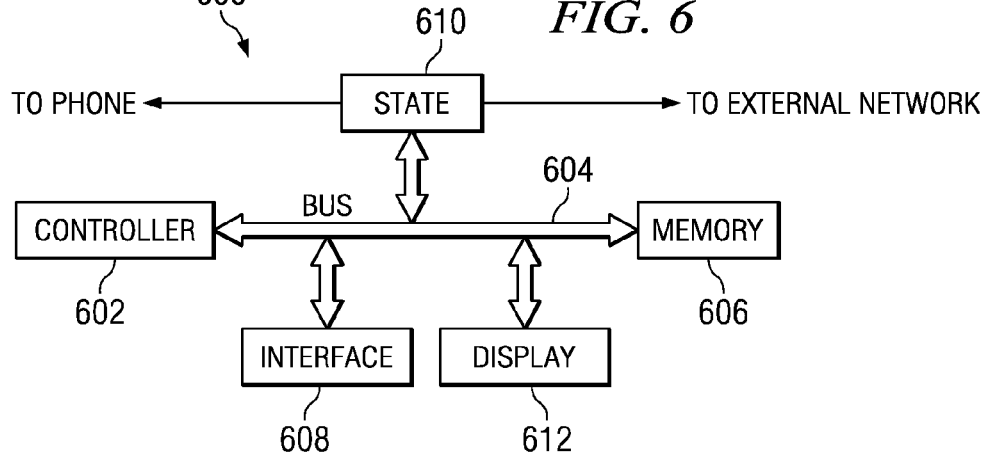
FIG. 6 is a block diagram of a switch box for use with a single phone in accordance with an illustrative embodiment.

FIG. 6 is a block diagram of a switch box for use with a single phone in accordance with an illustrative embodiment. Switch box 600 is a switch box, such as switch box 416 in FIG. 4. Switch box 600 is connected to a phone (not shown), such as phone 406, and an internal network (not shown), such as internal network 414 in FIG. 4. Switch box 600 contains controller 602. Controller 602 may be central processing unit (cpu), or a chip containing programmable logic. Controller 602 uses bus 604 to communicate with other components of switch box 600. Controller 602 executes controller usable code stored in memory 606. Interface 608, state 610, and display 612 may be directly connected to bus 604, or interface 608. Alternately, state 610, and display 612 may be located near a phone, and connected to bus 604 using an internal network. Depending on the configuration of switch box 600, more than of one of interface 608, state 610, and display 612 may be connected to bus 604.

Controller 602 receives user input from interface 608 and performs one or more actions in response. State 610 is the state of the switch box. State 612 may have one of the states previously described, such as, for example, a disconnected state, a long-distance enabled state, a long-distance disabled state, a ringer-on state, and a ringer-off state. State 610 may also have additional states. Display 612 displays state 610 to a user of switch box 600. Display 612 is a display, such as display 424 in FIG. 4.

If a switch box is connected to each phone in a house, as in FIG. 4, then the switch box has one state 610, and one display 612. If a switch box is connected to two or more phones, as in FIG. 5, then the switch box has one state 610 and display 612 for each phone.

Figure 7:
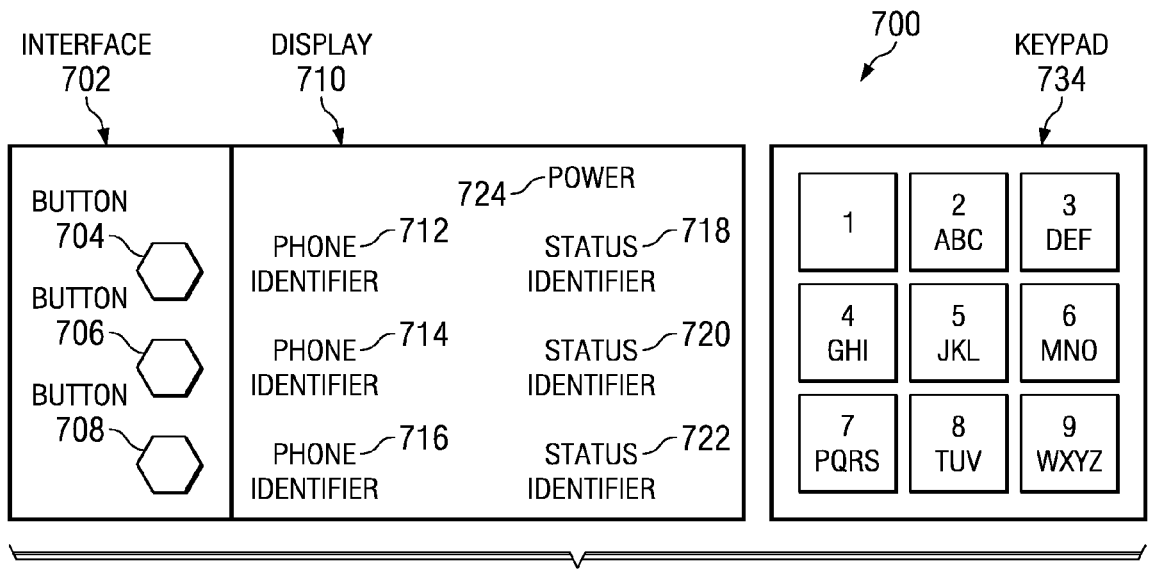
FIG. 7 is a block diagram of an interface and display for a switchbox in accordance with an illustrative embodiment.

FIG. 7 is a block diagram of an interface and display for a switchbox in accordance with an illustrative embodiment. Interface 702 is an interface, such as interface 608 in FIG. 6. Interface 702 contains a button for each phone in the house. Each button controls the state of a switchbox connected to each phone in the house. Each press of a button in buttons 704-708 changes the state of the corresponding switch box to a different state. The state of each switch box may cycle through a pre-set series of states. Pressing a specific sequence of buttons 704-708 may be used to enter a code to enable and disable interface 702.

In this example, buttons 704, 706, 708 correspond to three phones in a house. Those versed in the art will appreciate that more than three phones or fewer than three phones may be in a house, in which case the number of buttons will vary accordingly.

Display 710 is a display, such as display 424 in FIG. 4. Display 710 may use light emitting diodes, or a liquid crystal display. Display 710 may optionally contain a phone identifier. A phone identifier identifies each phone in a house. In this example, display 710 contains phone identifiers 712, 714, 716 corresponding to three phones in a house.

A status indicator indicates the state of a switchbox. In this example, status indicators 718, 720, and 722 correspond to three switch boxes connected to three phones. For example, status indicator 718 identifies the state of the switch box connected to the phone identified by phone identifier 712. Power 722 indicates whether a power supply (not shown) connected to display 710 is supplying power. Optionally, keypad 734 may be used with display 710.

In this example, keypad 734 may be used to enter numeric and alphanumeric characters. However, keypad 734 is only one example of a user interface for entering data, such as numeric and alphanumeric character. The illustrative embodiments are not limited to utilizing a keypad, such as keypad 734. For example, a voice recognition system or a touch screen or touch pad may also be used to enter numeric, alphanumeric characters, and/or symbols.

Figure 8:
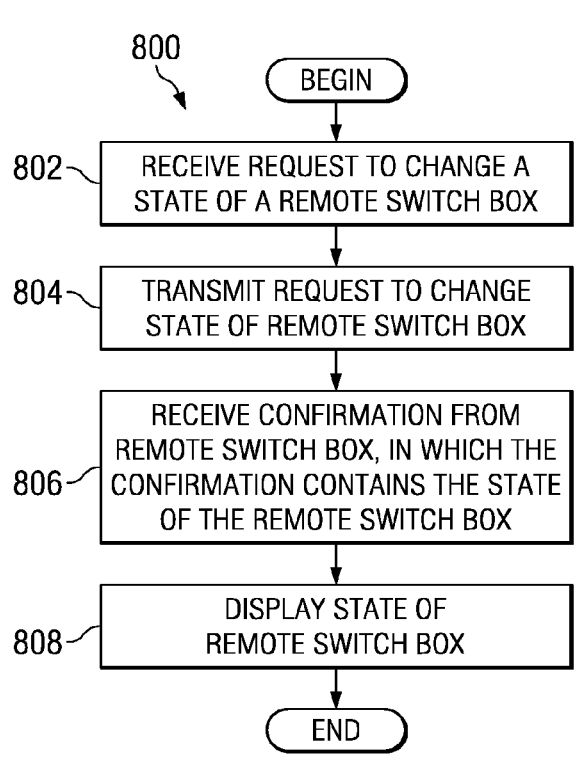
FIG. 8 is a flowchart for sending a request to change a state of a remote switch box in accordance with an illustrative embodiment.

FIG. 8 is a flowchart for sending a request to change a state of a remote switch box in accordance with an illustrative embodiment. The process in FIG. 8 is performed by a component for sending a request, such as controller 602, in FIG. 6.

The process begins when a user request to change a state of a remote switch box is received (step 802). A request to change the state of the remote switch box is transmitted (step 804). A confirmation from the remote switch box is received, in which the confirmation contains the state of the remote switch box (step 806). The state of each switch box is displayed (step 808), and the process ends.

Figure 9:
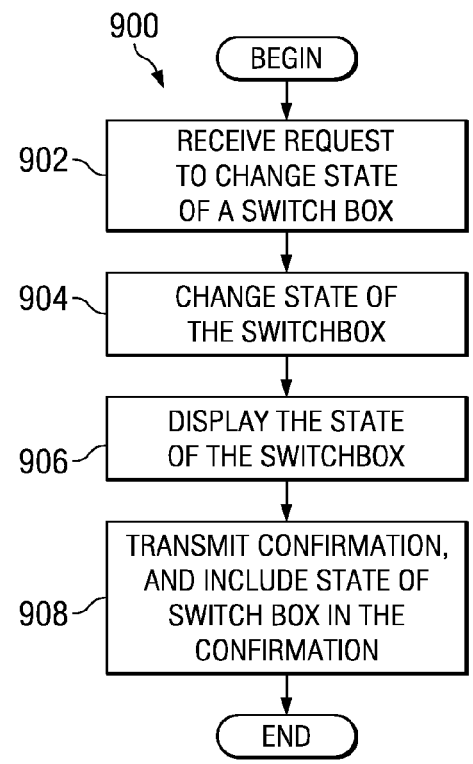
FIG. 9 is a flowchart for receiving a request to change a state of a switch box in accordance with an illustrative embodiment.

FIG. 9 is a flowchart for receiving a request to change a state of a switch box in accordance with an illustrative embodiment. The process in FIG. 9 is performed by a controller, such as controller 602, in FIG. 6. The process begins when a request to change a state of a switch box is received (step 902). The state of the switch box is changed (step 904). The state of the switch box is displayed (step 906). A confirmation message is sent to the requestor, in which the confirmation message includes the state of the switch box (step 908), and the process ends.

Thus, the illustrative embodiments described herein provide a computer implemented method, and apparatus for changing a state of a remote switch box. On a master switch box, a request is received from a user to set a state of the remote switch box to a selected state. A request to change the remote switch box to the selected state is transmitted from the master switch box to the remote switch box. The remote switch box connects a remote phone to a phone line. The master switch box receives a confirmation from the remote switch box of the change to the selected state. The confirmation contains the state of the remote switch box. The state of the remote switch box is displayed on the master switch box.

The illustrative embodiments allow a user to change the state of each remote switch box in a house. For example, a user can change the state of one or more remote switch boxes in the house to a disconnected state to prevent other occupants of the house from disrupting an important phone conversation. A user can change the state of one or more remote switch boxes in the house to prevent a phone connected to each remote switch box from making a long distance phone call.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for changing a state of a remote switch box, the method comprising:
    responsive to receiving, on a master switch box, a request from a user to set the state of the remote switch box to a selected state, transmitting a request to change the remote switch box to the selected state from the master switch box to the remote switch box, wherein the remote switch box connects a remote phone to a phone line; and
    responsive to receiving, on the master switch box, a confirmation from the remote switch box of the change to the selected state, wherein the confirmation contains the state of the remote switch box, displaying the state of the remote switch box to the user on the master switch box.

2. The method of claim 1, further comprising:
    responsive to receiving on the remote switch box the request from the master switch box to change the state of the remote switch box, changing the state of the remote switch box to the selected state;
    displaying the state of the remote switch box to a user of the remote switch box; and
    transmitting a confirmation to the master switch box, wherein the confirmation contains the state of the remote switch box.

3. The method of claim 1, wherein the selected state is one of connected to the phone line, and disconnected from the phone line.

4. The method of claim 1, wherein the selected state is listening to the phone line, wherein listening to the phone line allows a user of the remote phone to listen to the phone line containing a conversation on the master phone.

5. The method of claim 1, wherein the selected state prevents a user of the remote phone from making a long-distance call.

6. The method of claim 1, wherein the selected state is one of ringer on, and ringer off, wherein ringer on enables a ringer in the remote phone, and wherein ringer off disables the ringer in the remote phone.

7. A system for changing a state of a remote switch box, the system comprising:
    a network;
    a set of switch boxes attached to the network, wherein each switch box contains a display, wherein the set of switch boxes contains the remote switch box, and wherein at least one switch box in the set of switch boxes is designated a master switch box; and
    a set of phones, wherein each phone in the set of phones is connected to the network through a switch box in the set of switch boxes, and wherein the master switch box, responsive to receiving a request from a user to set the remote switch box to a selected state, transmits a request to change the remote switch box to the selected state; and responsive to the master switch box receiving a confirmation from the remote switch box of the change to the selected state, wherein the confirmation contains a state of the remote switch box, displaying on the master switch box the state of the remote switch box to the user.

8. The system of claim 7, further comprising:
    responsive to receiving the request from the master switch box to change the state of the remote switch box, the remote switch box changes the state of the remote switch box to the selected state; displays the state of the remote switch box to a user of the remote switch box; and transmits a confirmation to the master switch box, wherein the confirmation contains the state of the remote switch box.

9. The system of claim 7, wherein the selected state is one of connected to the phone line, and disconnected from the phone line.

10. The system of claim 7, wherein the selected state is listening to the phone line, wherein listening to the phone line allows a user of the remote phone to listen to the phone line containing a conversation on the master phone.

11. The system of claim 7, wherein the selected state prevents a user of the remote phone from making a long-distance call.

12. The system of claim 7, wherein the selected state is one of ringer on, and ringer off, wherein ringer on enables a ringer in the remote phone, and wherein ringer off disables the ringer in the remote phone.

13. A master switch box for changing a state of a remote switch box, the system comprising:
    a bus;
    a memory device connected to the bus, wherein the memory device contains executable code;
    an interface connected to the bus, wherein the interface is used to receive input from a user of the switch box;
    a state connected to the bus, wherein the state connects the phone to a phone line;
    a display connected to the bus, wherein the display is used to display output to the user of the master switch box;
    a transmitter connected to the bus;
    a receiver connected to the bus; and
    a controller connected to the bus for executing the executable code, wherein responsive to the interface receiving a request from the user to set the state of the remote switch box, the controller executes the executable code to transmit, from the master switch box to the remote switch box, a request to change the state of the remote switch box to the selected state, wherein the remote switch box connects a remote phone to the phone line, responsive to receiving a confirmation from the remote switch box of the change to the selected state, wherein the confirmation contains a status of the remote switch box, displaying, on the master switch box, the status of the remote switch box to the user.

14. The master switch box of claim 13, further comprising:
responsive to receiving on the remote switch box the request from the master switch box to change the state of the remote switch box, changing the state of the remote switch box to the selected state;
displaying the state of the remote switch box to a user of the remote switch box; and
transmitting a confirmation to the master switch box, wherein the confirmation contains the state of the remote switch box.

15. The master switch box of claim 13, wherein the selected state is one of connected to the phone line, and disconnected from the phone line.

16. The master switch box of claim 13, wherein the selected state is listening to the phone line, wherein listening to the phone line allows a user of the remote phone to listen to the phone line containing a conversation on the master phone.

17. The master switch box of claim 13, wherein the selected state prevents a user of the remote phone from making a long-distance call.

18. The master switch box of claim 13, wherein the selected state is one of ringer on, and ringer off, wherein ringer on enables a ringer in the remote phone, and wherein ringer off disables the ringer in the remote phone.

* * * * *